United States Patent
Cho et al.

(10) Patent No.: US 9,334,954 B2
(45) Date of Patent: May 10, 2016

(54) METHOD FOR CONTROLLING SLIP OF A CONTINUOUSLY VARIABLE TRANSMISSION

(71) Applicant: Hyundai Autron Co., Ltd., Seongnam-si (KR)

(72) Inventors: Seo Yeon Cho, Suwon-si (KR); Jang Sun Sim, Yongin-si (KR); Gyeong Hwan Yoon, Uijeongbu-si (KR); Hyoung Chang Hahm, Seoul (KR)

(73) Assignee: HYUNDAI AUTRON CO., LTD., Seongnam-Si (KR)

( * ) Notice: Subject to any disclaimer, the term of this patent is extended or adjusted under 35 U.S.C. 154(b) by 0 days.

(21) Appl. No.: 14/566,502

(22) Filed: Dec. 10, 2014

(65) Prior Publication Data

US 2016/0097451 A1    Apr. 7, 2016

(30) Foreign Application Priority Data

Oct. 2, 2014  (KR) .................. 10-2014-0132744

(51) Int. Cl.
*F16H 61/662* (2006.01)

(52) U.S. Cl.
CPC *F16H 61/66272* (2013.01); *F16H 2061/66277* (2013.01)

(58) Field of Classification Search
CPC ................. F16H 61/66272; F16H 2061/6629; B60W 10/107
See application file for complete search history.

(56) References Cited

U.S. PATENT DOCUMENTS

2006/0183581 A1\* 8/2006 Iwatsuki et al. ................. 474/8

\* cited by examiner

*Primary Examiner* — Huan Le
(74) *Attorney, Agent, or Firm* — Mayer Brown LLP; Hyunho Park

(57) ABSTRACT

Disclosed herein is a method for controlling slip of a continuously variable transmission using a transmission control unit (TCU), comprising: receiving, by a transmission control unit, information related to determination of slip which occurs during vehicle's running; calculating a slip determining coefficient by the transmission control unit; determining, by the transmission control unit, whether the slip has occurred according to the slip determining information and a predefined slip determining algorithm; and selecting and switching to, by the transmission control unit, one of a plurality of preset slip modes based on the slip determining coefficient and a result obtained by determining whether the slip has occurred.

10 Claims, 3 Drawing Sheets

METHOD FOR CONTROLLING SLIP OF A CONTINUOUSLY VARIABLE TRANSMISSION

CROSS-REFERENCES TO RELATED APPLICATIONS

The present application claims priority to Korean Patent application No. 10-2014-0132744, filed on Oct. 2, 2014, which is incorporated hereby by reference in its entirety.

BACKGROUND OF THE INVENTION

1. Field of the Invention

The present disclosure relates generally to a method for controlling slip of a continuously variable transmission (CVT), and more specifically, a method for controlling slip of a continuously variable transmission (CVT) which can enhance fuel efficiency by reducing loss of hydraulic power within a range in which slip does not occur, by decreasing clamping force of a primary pulley and a secondary pulley based on a control input torque of the primary pulley of a continuously variable transmission (CVT).

2. Discussion of Related Art

Generally, a continuously variable transmission (CVT) is advantageous in that it has a high efficiency because an operation point of an engine is close to OOL (Optimal Operating Line) over a conventional multi-step automatic transmission. However, the CVT is disadvantageous in that as the control pressure and friction loss are also high, its own efficiency is low and torque capacity is limited.

More concretely, transmission of the CVT can be performed as a rotation radius of the belt is continuously changed by axially translating a primary pulley and a secondary pulley while providing clamping force to the pulleys.

By the way, if the clamping force applied to the pulleys is greater than that required, excessive tension occurs on the belt, thereby shortening lifetime of the belt, as well as causing loss of hydraulic power required to generate the clamping force. On the contrary, if the clamping force is very low, a speed difference between the belt and the pulleys occur, thereby causing macroscopic slip resulting in loss of a power transfer function.

The related art of the present invention is disclosed in Korean Patent No. 10-1042064 issued on Jun. 9, 2011 and entitled "Continuously variable transmission operating method".

SUMMARY OF THE INVENTION

In view of the above, embodiments of the present invention has been made to solve the problems of the above-mentioned conventional CVT, and thus embodiments of the present invention are directed to a method for controlling slip of a continuously variable transmission (CVT) which can enhance fuel efficiency by reducing loss of hydraulic power within a range in which slip does not occur, and by decreasing clamping force of a primary pulley and a secondary pulley based on a control input torque of the primary pulley of a continuously variable transmission (CVT) to lower a safety coefficient.

A method for controlling slip of a continuously variable transmission according to an embodiment of the present invention may include: receiving, by a transmission control unit, information related to determination of slip which occurs during vehicle's running (hereinafter referred to as "slip determining information"); calculating a slip determining coefficient by the transmission control unit; determining, by the transmission control unit, whether the slip has occurred according to the slip determining information and a predefined slip determining algorithm; and selecting and switching to, by the transmission control unit, one of a plurality of preset slip modes based on the slip determining coefficient and a result obtained by determining whether the slip has occurred.

According to an embodiment, the plurality of slip modes may comprise at least one of a normal mode, a line pressure optimal mode, a slip control mode, a slip optimal mode, and a slip pause mode.

According to an embodiment, the slip determining information may comprise: at least one of an opening value of a throttle valve which is changed upon acceleration/deceleration of a vehicle by a driver, a rotation speed of a primary pulley, a rotation speed of a secondary pulley, information from an oil temperature sensor, information from an inhibitor sensor, information related to a brake actuation, and information related to torque.

According to an embodiment, the slip determining coefficient may be calculated by using differentiated values of rotation speeds of a primary pulley and a secondary pulley and a gear ratio of a variator.

According to an embodiment, the transmission control unit may be configured to decrease a line pressure to a target line pressure with a predetermined constant slope in a line pressure optimal mode when a difference between a target gear ratio and a real gear ratio is below a predetermined range, and the line pressure optimal mode is a mode for decreasing the line pressure to a higher pressure than higher one of the pressures of a primary pulley and a secondary pulley by a predetermined certain margin.

According to an embodiment, in selecting and switching to one of the plurality of slip modes, the transmission control unit may switch from a line pressure optimal mode to a slip control mode, when the torque remains in a predetermined constant value and a gear ratio remains in the predetermined range for a predetermined period of time. Herein, the line pressure optimal mode is a mode for setting minimal line pressure necessary to control a primary pulley and a secondary pulley of the continuously variable transmission, and the slip control mode is a mode for decreasing a control input torque of the primary pulley which is used for calculating clamping force of the primary pulley and the secondary pulley of the continuously variable transmission, to a predetermined target input torque.

According to an embodiment, the transmission control unit may decrease the control input torque of a primary pulley to the target input torque with the predetermined constant slope gradually in the slip control mode to lower a slip safety coefficient slowly.

According to an embodiment, as the control input torque of the primary pulley approaches the target input torque, the slip safety coefficient is decreased and on the contrary the slip determining coefficient is gradually increased. When the slip determining coefficient is great than a preset value where an initial slip is expected to occur, the transmission control unit may perform switching from the slip control mode to a slip optimal mode, and when the slip determining coefficient is decreased below a preset value where stabilization is expected, the transmission control unit may perform switching from the slip optimal mode to the slip control mode again, wherein the slip optimal mode is a mode in which torque compensation is performed when the slip is expected.

According to an embodiment, performing torque compensation may comprise: compensating torque by increasing the control input torque of the primary pulley abruptly over the predetermined constant slope such as in a stepwise fashion or in a pulse shape by the transmission control unit.

According to an embodiment, in selecting and switching to one of the plurality of slip modes, the transmission control unit may perform switching from the slip control mode or the slip optimal mode to the slip pause mode when an arithmetic slip has occurred by the slip determining algorithm due to a change of a driving situation of a vehicle or a frequent change of a gear ratio in the slip control mode or the slip optimal mode. Herein, the arithmetic slip occurs when the slip determining coefficient rises abruptly beyond a threshold slope and when torque becomes greater than a predetermined torque threshold value. The slip pause mode is a mode for stabilizing a transmission or a torque change when the slip has occurred by the slip determining algorithm due to a transmission/torque change rather than a physical slip.

According to an embodiment, the transmission control unit may be configured to: pause a slip determining operation for a predetermined period of time and perform torque compensation until the slip determining algorithm is stabilized in the slip pause mode; and perform switching from the slip pause mode to the slip control mode, when the slip determining coefficient remains within a predetermined range over a predetermined period of time.

An embodiment of the present invention provides a method for controlling slip of a continuously variable transmission which can enhance fuel efficiency by reducing loss of hydraulic power within a range in which slip does not occur, and by decreasing clamping force of a primary pulley and a secondary pulley based on a control input torque of the primary pulley of a continuously variable transmission (CVT) to lower a safety coefficient.

DESCRIPTION OF SPECIFIC EMBODIMENTS

Embodiments of a method for controlling slip of a continuously variable transmission CVT according to the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
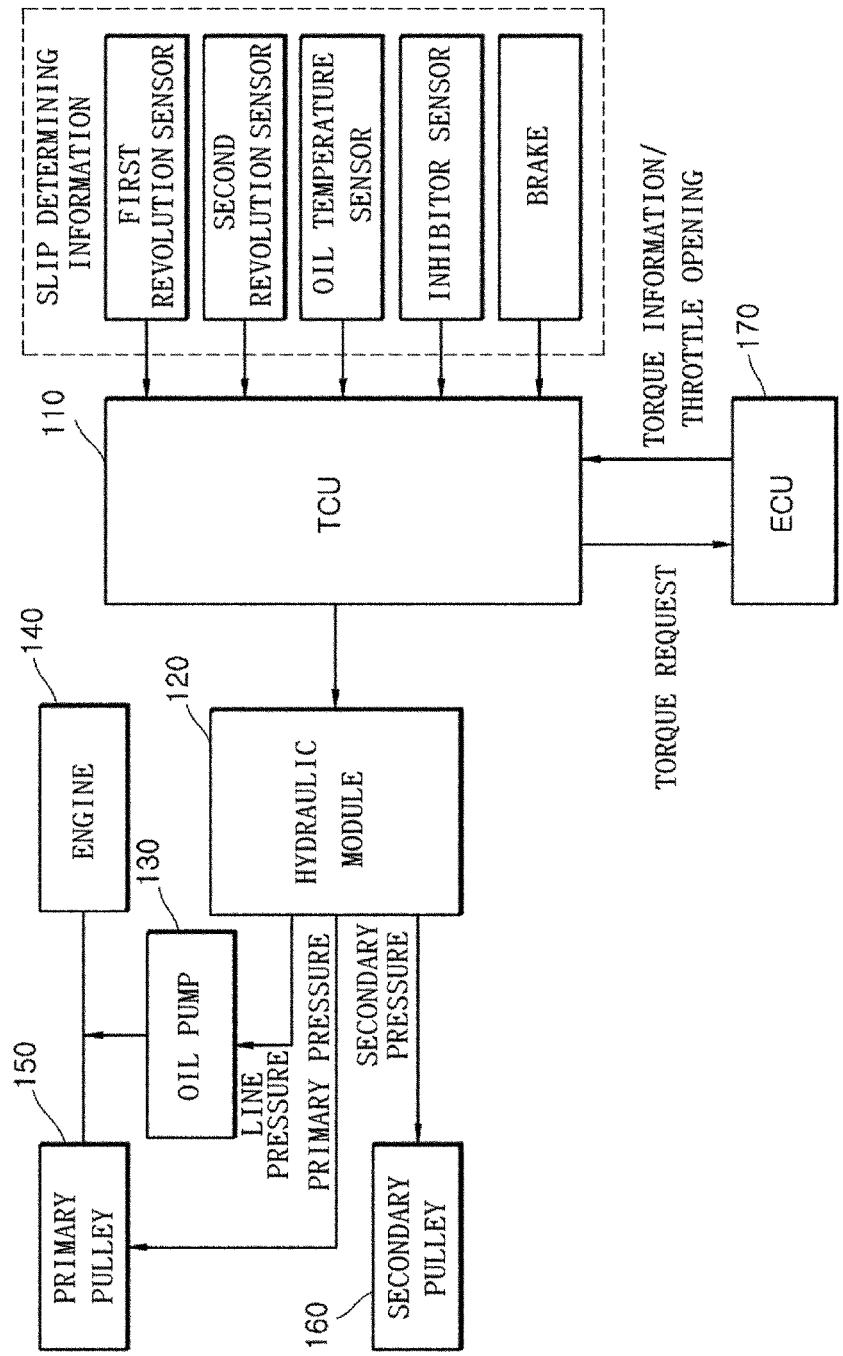
FIG. 1 is an illustrative diagram showing a schematic configuration of a slip controlling device of a continuously variable transmission according to an embodiment of the present invention.

FIG. 1 is an illustrative diagram showing a schematic configuration of a slip controlling device of a continuously variable transmission (CVT) according to an embodiment of the present invention.

As shown in FIG. 1, the slip controlling device of the CVT according to an embodiment of the present invention may include a transmission control unit (TCU) 110, a hydraulic module 120, an oil pump 130, an engine 140, a primary pulley 150, a secondary pulley 160, and an engine control unit (ECU) 170.

The transmission control unit 110 may receive information which may be generated as a vehicle is running (e.g., at least one of an opening value of a throttle valve which is changed upon acceleration/deceleration by a driver, a rotation speed of the primary pulley (information from a first revolution sensor), a rotation speed of the secondary pulley (information from a second revolution sensor), information related to temperature from an oil temperature sensor, information from an inhibitor sensor, and information related to the actuation of a brake) and determine whether slip has occurred, based on a predefined slip determining algorithm.

Further, the transmission control unit 110 may collect information related to rotational acceleration and speeds of the primary pulley 150 and the secondary pulley 160 and perform control of clamping force based on the information.

The transmission control unit 110 may control a primary pulley pressure (primary pressure) to prevent the slip. In this case a secondary pulley pressure (secondary pressure) can be controlled according to the primary pulley pressure (primary pressure). That is, the transmission control unit 110 may control a gear ratio of the secondary pulley 160.

The hydraulic module 120 may control a line pressure, the primary pulley pressure (primary pressure), and the secondary pulley pressure (secondary pressure) under the control of the transmission control unit (TCU) 110. The hydraulic module 120 may be implemented as a regulator valve for regulating the line pressure in the continuously variable transmission, or any other pressure control element.

The oil pump 130 may generate the line pressure under the control of the hydraulic module 120 when an engine torque is transferred from the engine 140 to the primary pulley 150.

The primary pulley 150 and the secondary pulley 160 may perform continuous transmission according to the actuation pressure from the hydraulic module 120.

The engine control unit (ECU) 170 may detect information related to the torque which is generated during the operation of the engine 140 and the opening value of the throttle valve and output the information to the transmission control unit 110.

Further, the transmission control unit 110 may determine whether the slip has occurred based on the slip determining information according to the predefined slip determining algorithm, and control to set a slip mode of a continuously variable transmission from to one of a plurality of preset slip modes, to reduce loss of hydraulic power within a range in which slip does not occur, thus enhancing fuel efficiency.

Figure 2:
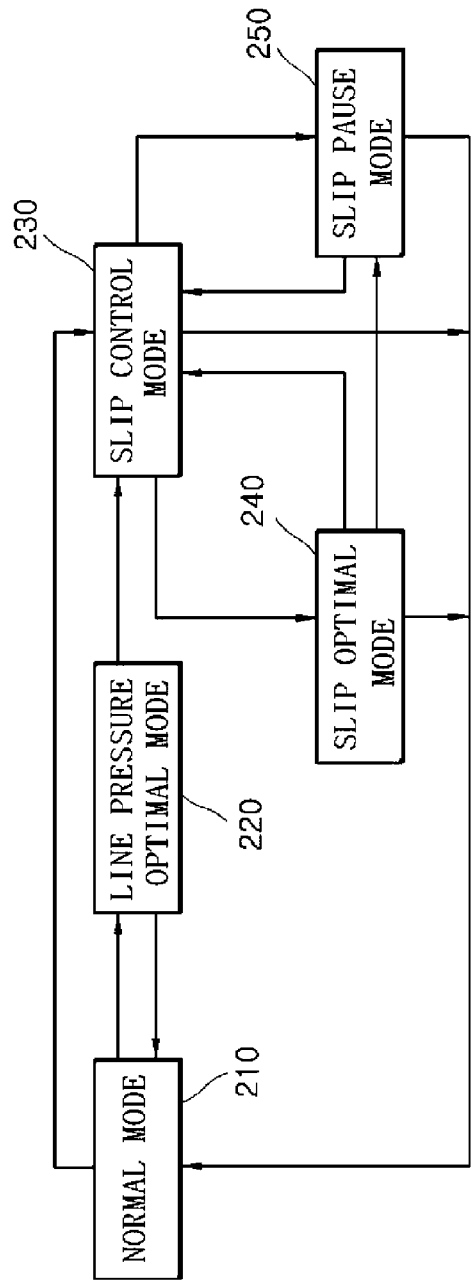
FIG. 2 is an illustrative diagram illustrating an operation flow between a plurality of slip modes in the slip controlling device in FIG. 1.

For example, the plurality of slip modes may include a normal mode, a line pressure optimal mode, a slip control mode, a slip optimal mode, and a slip pause mode (see FIG. 2).

FIG. 2 is an illustrative diagram illustrating an operation flow between a plurality of slip modes in the slip controlling device in FIG. 1. Referring to FIG. 2, the operation of each of the plurality of slip modes will be in detail below.

As shown in FIG. 2, the line pressure optimal mode is a mode for minimizing an excessive margin of the line pressure. That is, the line pressure optimal mode is a mode in which minimal line pressure necessary to control the primary pulley and secondary pulley is preset (see FIG. 3).

Figure 3:
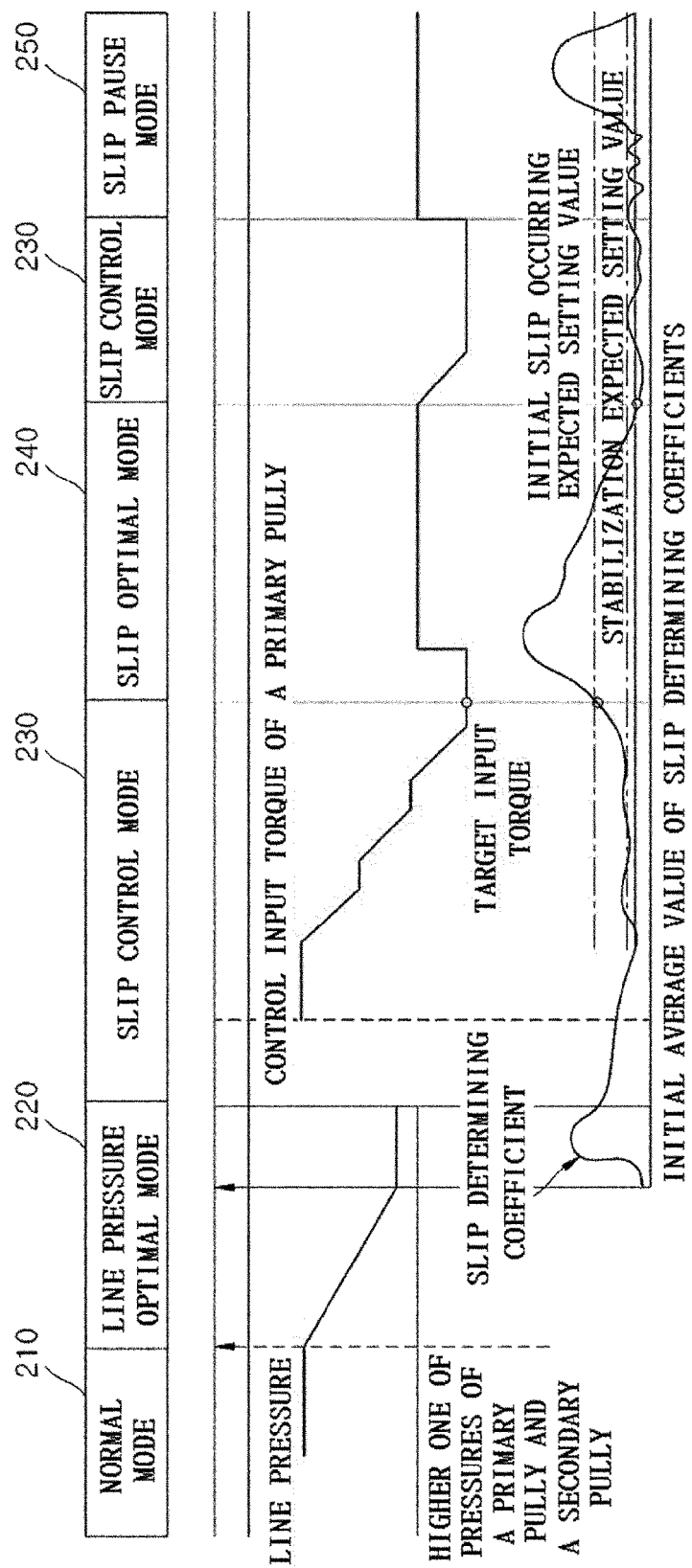
FIG. 3 is an illustrative diagram showing a graph illustrating conditions for switching between the slip modes and the switching operation in the operation flow in FIG. 2.

FIG. 3 is an illustrative diagram showing a graph illustrating conditions for switching between the slip modes and the switching operation in the operation flow in FIG. 2, where the switching operation is switched from a normal mode 210 via a line pressure optimal mode 220 to a slip control mode 230, and is switched from the slip control mode 230 to a slip optimal mode 240 and again to the slip control mode 230, and then is switched from the slip control mode 230 to a slip pause mode 250.

Referring to the graph in lower parts of the normal mode 210 and the line pressure optimal mode 220 in FIG. 3, the transmission control unit 110 may control to decrease the line pressure to a target line pressure with a predetermined constant slope in the line pressure optimal mode 220 when a difference between a target gear ratio and a real gear ratio is equal to or less than a predetermined range. That is, in the line pressure optimal mode 220, the line pressure can be decreased until the line pressure has a higher pressure than higher one of the pressures of the primary pulley 150 and the secondary pulley 160 by a certain margin.

That is to say, the target line pressure may be set as a value obtained by adding extra pressure (i.e. certain margin) to higher one of the pressures of the primary pulley 150 and the secondary pulley 160. The reason is that as hydraulic power used in actuators (not shown) in both pulleys, i.e., the primary pulley and the secondary pulley is higher than that in other clutches (not shown), the hydraulic power used in the actuator is used to determine the target line pressure.

And, when the line pressure reaches the target line pressure, the target line pressure will become smaller than the line pressure in a conventional general running mode.

Thus, fuel efficiency may be enhanced by reducing loss of hydraulic power necessary to generate the line pressure (i.e. the target line pressure). That is, the fuel efficiency may be enhanced by reducing loss of hydraulic power necessary to generate the line pressure by minimizing the excessive margin of the line pressure which forms the basis of the primary pulley pressure and the secondary pulley pressure. In this case, the certain margin may be regulated.

Then, the switching operation between the remaining slip modes (e.g., the slip control mode, the slip optimal mode, the slip pause mode) may be performed when the excessive margin of the line pressure is minimized.

Returning to FIG. 2, the slip control mode 230 is a mode for controlling the clamping force into a target clamping force, in which the transmission control unit 110 decreases the control input torque of the primary pulley for calculating clamping force of the primary pulley and the secondary pulley of CVT, to a predetermined target input torque.

That is to say, the transmission control unit 110 may switch from the line pressure optimal mode 220 to the slip control mode 230 when torque is remains in a predetermined constant value and the gear ratio remains in the predetermined range for a predetermined period of time. The transmission control unit 110 may decrease gradually the control input torque of the primary pulley to the target input torque with the predetermined constant slope in the slip control mode 230.

As mentioned above, slip does not occur if the control input torque of the primary pulley is decreased gradually with the constant slope, thereby decreasing the control input torque of the primary pulley.

Here, decreasing the control input torque of the primary pulley refers to lowering the safety coefficient.

That is to say, the transmission control unit 110 may decrease the control input torque of the primary pulley (i.e. the clamping force of the primary pulley) to lower the safety coefficient, as mentioned above, and further, may reduce loss of hydraulic power within the range in which slip does not occur, to enhance fuel efficiency.

For reference, the clamping force is usually controlled to provide the safety coefficient that is about 1.3 times larger than that calculated from the control input torque to prevent slippage (i.e. slip). Thus, the fuel efficiency may be enhanced as loss of hydraulic power is decreased if the safety coefficient of the clamping force is lowered.

And, the transmission control unit 110 may control the operation to reach the target clamping force (i.e. the control input torque of the primary pulley) for a given period of time, and at the same time perform the change of the gear ratio.

By the way, if the change of the gear ratio occurs frequently, the transmission control unit may determine that slip by the predefined slip determining algorithm (arithmetic slip) has occurred (i.e., this is a slip determining error of determining that the slip has occurred, despite the physical slip did not occur).

Therefore, to avoid this situation, the transmission control unit 110 may control to maintain the current gear ratio if the increment/decrement of the change of the gear ratio is not large, upon entering into the slip control mode 230.

On the one hand, as mentioned above, as the clamping force approaches the target clamping force (i.e. the target input torque of the primary pulley), the safety coefficient can be decreased and also the slip determining coefficient can be gradually risen, as shown in the graph in lower part of the slip control mode 230 in FIG. 3. Here, the slip determining coefficient may be calculated from the differentiated values of rotation speeds of the primary pulley and the secondary pulley, and the gear ratio of a variator by the transmission control unit 110.

As mentioned above, when a rising slip determining coefficient is larger than an expected slip determining value (i.e. a preset value where an initial slip is expected to occur), the transmission control unit 110 may switch the slip mode from the slip control mode 230 to the slip optimal mode 240.

The slip optimal mode 240 is a mode for performing torque compensation when slip is expected. Referring to the graph in the lower part of the slip optimal mode 240 in FIG. 3, the control input torque of the primary pulley is increased in a stepwise fashion (or in a pulse shape) over the predetermined constant slope to compensate torque.

In this case, it should be noted that when the control input torque of the primary pulley is decreased, the control input torque is decreased gradually with the predetermined constant slope, whereas when the torque compensation is performed, the torque is abruptly increased like a pulse shape. As mentioned above, the physical slip is prevented from occurring by decreasing gradually the control input torque of the primary pulley with the constant slope, and also the physical slip is prevented from occurring by increasing abruptly torque like a pulse shape when occurrence of slip is expected.

And, if the slip determining coefficient is decreased below an expected stabilization setting value (ie, a preset value where stabilization is expected) according to driving situations of a vehicle in which the pressure is controlled in the slip optimal mode 240, the transmission control unit 110 may switch the slip mode from the slip optimal mode 240 to the slip control mode 230 again.

The transmission control unit 110 may control the control input torque of the primary pulley to the target input torque again in the slip control mode 230. Thus, as mentioned above, the physical slip is prevented from occurring if the control input torque of the primary pulley is decreased gradually with the predetermined constant slope.

And, if the slip by the slip determining algorithm (arithmetic slip) occur due to a frequent change of the driving situation of a vehicle or a frequent change of the gear ratio in the slip control mode 230 or the slip optimal mode 240 (i.e., the slip determining error of determining that the slip has occurred, despite the physical slip did not occur) (e.g., if the slip determining coefficient is risen suddenly beyond a threshold slope), the transmission control unit 110 may switch the slip mode to the slip pause mode.

In the graph shown in FIG. 3, the switching operation which is switched from the slip control mode 230 to the slip pause mode 250 is not shown.

The reason is that the slip by the slip determining algorithm (i.e., the slip determining error) is not determined simply only based on the slip determining coefficient, but is determined based on a combination of information which is generated during vehicle's running (e.g., at least one of an opening value of the throttle valve which is changed upon acceleration/deceleration by a driver, a rotation speed of the primary pulley (information from the first revolution sensor), a rotation speed of the secondary pulley (information from the second revolution sensor), information related to temperature from an oil temperature sensor, information from an inhibitor sensor, and information related to a brake actuation) or information received from the engine control unit 170, as shown in FIG. 1.

That is, the slip pause mode 250 is a mode for stabilizing the transmission or the torque change when slip is determined by the slip determining algorithm based on the transmission/torque change, rather than the physical slip.

For example, the slip pause mode 250 may be performed when the torque is large than a predetermined torque threshold value abruptly, when oil temperature is abruptly risen, and when the operation mode enters into a manual mode.

In the slip pause mode 250, the transmission control unit 110 may increase abruptly the control input torque of the primary pulley beyond the predetermined constant slope in a stepwise fashion (or in a pulse shape) to compensate torque. As mentioned above, the physical slip is prevented from occurring by abruptly increasing torque compensation in a stepwise slope like a pulse shape.

And, the transmission control unit 110 may pause temporarily (i.e. for a predetermined period of time) a slip determining operation by the slip determining algorithm. And the torque is compensated until the slip determining algorithm is stabilized. That is, if the slip determining coefficient remains within a predetermined range for a predetermined period of time, the transmission control unit 110 may switch from the slip pause mode 250 to the slip control mode 230 again.

As mentioned above, embodiments according to the present invention may enhance fuel efficiency by reducing loss of hydraulic power within the range in which slip does not occur, by decreasing excessive line pressure, and in more particular enhance fuel efficiency by reducing loss of hydraulic power within the range in which slip does not occur, and by optimizing the clamping force of the primary pulley while switching among the slip control mode, the slip optimal mode, and the slip pause mode to lower the safety coefficient, based on slip determining information according to the slip determining algorithm.

The embodiments of the present invention have been disclosed above for illustrative purposes. Those skilled in the art will appreciate that various modifications, additions and substitutions are possible, without departing from the scope and spirit of the invention as disclosed in the accompanying claims.

What is claimed is:

1. A method for controlling slip of a continuously variable transmission (CVT) using a transmission control unit (TCU), comprising:

receiving, by the transmission control unit, information related to determination of slip which occurs during vehicle's running (hereinafter referred to as "slip determining information");

calculating a slip determining coefficient by the transmission control unit;

determining, by the transmission control unit, whether the slip has occurred, based on the slip determining information and a predefined slip determining algorithm; and selecting and switching to, by the transmission control unit, one of a plurality of preset slip modes based on the slip determining coefficient and a result obtained by determining whether the slip has occurred, wherein the slip determining coefficient is calculated by using differentiated values of rotation speeds of a primary pulley and a secondary pulley, and a gear ratio of a variator.

2. The method of claim 1, wherein the slip determining information comprises:

at least one of an opening value of a throttle valve which is changed upon acceleration/deceleration of a vehicle by a driver, a rotation speed of a primary pulley, a rotation speed of a secondary pulley, information from an oil temperature sensor, information from an inhibitor sensor, information related to a brake actuation, and information related to torque.

3. The method of claim 1, wherein the transmission control unit is configured to decrease a line pressure to a target line pressure with a predetermined constant slope in a line pressure optimal mode when a difference between a target gear ratio and a real gear ratio is below a predetermined range, wherein the line pressure optimal mode is a mode for decreasing the line pressure to a pressure that is a predetermined margin above a higher one of a) a pressure of a primary pulley and b) a pressure of a secondary pulley.

4. The method of claim 1, wherein the plurality of slip modes comprises at least one of a normal mode, a line pressure optimal mode, a slip control mode, a slip optimal mode, and a slip pause mode.

5. The method of claim 4, wherein in selecting and switching to one of the plurality of slip modes, the transmission control unit performs switching from the slip control mode or the slip optimal mode to the slip pause mode when an arithmetic slip has occurred by the slip determining algorithm due to a change of a driving situation of a vehicle or a frequent change of a gear ratio in the slip control mode or the slip optimal mode, wherein the arithmetic slip occurs when the slip determining coefficient rises abruptly beyond a threshold slope and when torque becomes greater than a predetermined torque threshold value, wherein the slip pause mode is a mode for stabilizing a transmission or a torque change when the slip has occurred by the slip determining algorithm due to a transmission/torque change rather than a physical slip.

6. The method of claim 5, wherein the transmission control unit is configured to:

pause a slip determining operation for a predetermined period of time and perform torque compensation until the slip determining algorithm is stabilized in the slip pause mode; and perform switching from the slip pause mode to the slip control mode, when the slip determining coefficient remains within a predetermined range over a predetermined period of time.

7. The method of claim 1, wherein in selecting and switching to one of the plurality of slip modes, the transmission control unit performs switching from a line pressure optimal mode to a slip control mode, when the torque remains in a predetermined constant value and a gear ratio remains in the predetermined range for a predetermined period of time,
    wherein the line pressure optimal mode is a mode for setting minimal line pressure necessary to control a primary pulley and a secondary pulley of the continuously variable transmission,
    wherein the slip control mode is a mode for decreasing a control input torque of the primary pulley which is used for calculating clamping force of the primary pulley and the secondary pulley of the continuously variable transmission, to a predetermined target input torque.

8. The method of claim 7, wherein the transmission control unit decreases the control input torque of the primary pulley to the target input torque with a predetermined constant slope gradually in the slip control mode to lower a slip safety coefficient slowly.

9. The method of claim 8, wherein as the control input torque of the primary pulley approaches the target input torque, the slip safety coefficient is decreased and on the contrary the slip determining coefficient is gradually increased,
    wherein when the slip determining coefficient is greater than a preset value where an initial slip is expected to occur, the transmission control unit performs switching from the slip control mode to a slip optimal mode, and
    wherein when the slip determining coefficient is decreased below a preset value where stabilization is expected, the transmission control unit performs switching from the slip optimal mode to the slip control mode again,
    wherein the slip optimal mode is a mode in which torque compensation is performed when the slip is expected.

10. The method of claim 9, wherein performing the torque compensation comprises:
    compensating torque by increasing the control input torque of the primary pulley abruptly over the predetermined constant slope in a stepwise fashion or in a pulse shape by the transmission control unit.

* * * * *